United States Patent Office 2,961,696
Patented Nov. 29, 1960

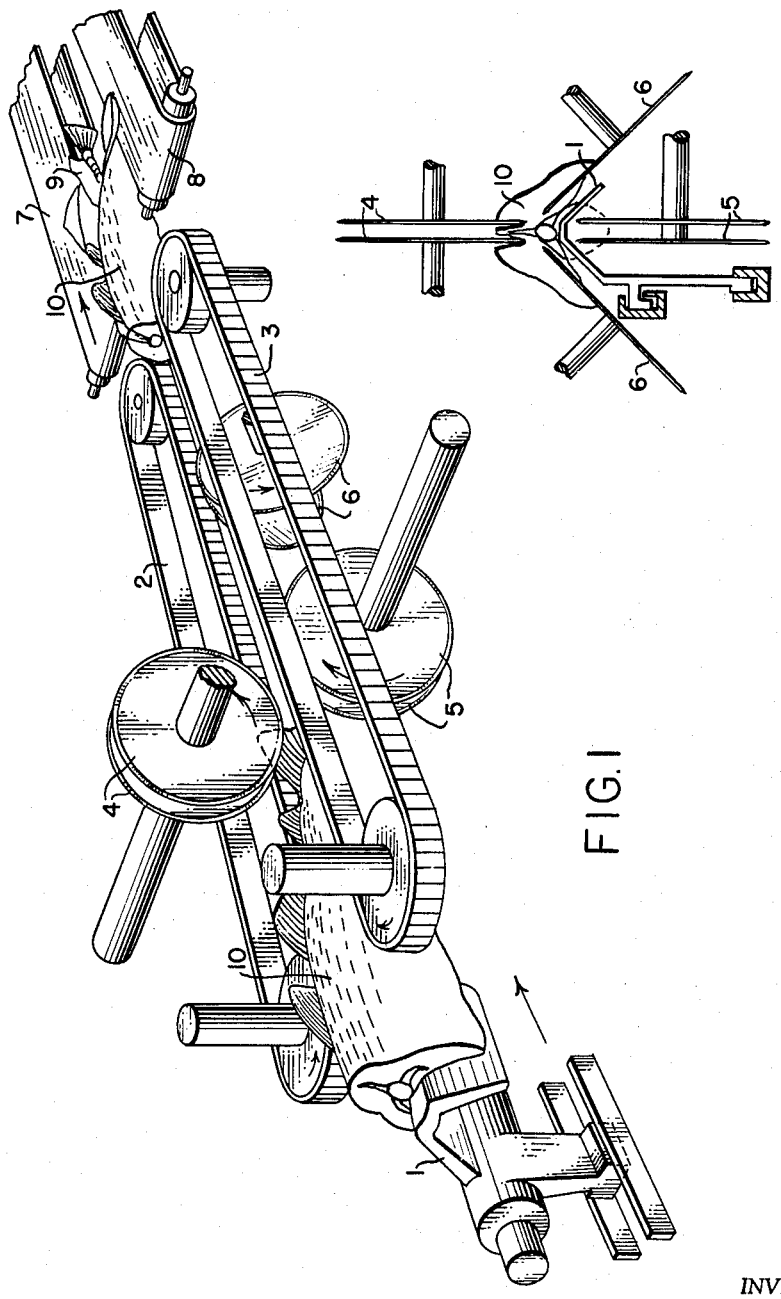

2,961,696

METHOD OF CONVEYING FISH PAST THE TOOLS OF A FISH DRESSING MACHINE

Johannes Michael, Ratzeburg, Germany, assignor to Nordischer Maschinenbau, Rud. Baader, Lubeck, Germany Filed May 16, 1957, Ser. No. 659,557

Claims priority, application Germany May 17, 1956

2 Claims. (Cl. 17—45)

The invention relates to apparatus for feeding fish past the tools of a fish dressing machine and consists in that the fish pushed tail foremost through the machine is straddled in the region of the belly cavity, is supported while being carried along from the end of the belly cavity to the root of the tail and at the same time stretched.

Many methods are known for conveying fish past the tools of a fish dressing machine, but it has hitherto not been possible to obtain an absolutely satisfactory result because the fish could not be supported and guided so that it runs through the dressing machine as a substantially rigid body and so that it could be worked in a perfect manner by the dressing tools. Fundamentally, there are two possibilities for conveying the fish, namely, by pulling or by pushing it. In the case of the first method, the tail is normally used as gripping element but this method is open to the objection that it is difficult to take up the tensile strain unavoidably occurring when the fish is being worked by the tools so that it does not have a detrimental effect on the fish. In the case of the second method, namely pushing the fish, it is difficult to take up the compressive strain occurring when working with the tools and in addition it is only possible, especially when the belly cavity is opened up, to use rigid guides which are complicated and in addition require accurately centered guiding to the respective guide aggregates in the case of each successive tool.

It has now been found that it is possible when dressing decapitated fish bodies with opened up belly cavity, as is the case when boning, filleting or the like, to convey the fish through the machine as a rigid body in a simple manner, if two separate conveyor systems are used one of which operates in the belly cavity and simultaneously supports, guides and conveys the entire belly region, whereas the other externally supports, guides and conveys the portion of the fish extending from the end of the belly cavity to the root of the tail and in so doing at the same time holds practically the whole fish in stretched state, so that, when it is being worked by the tools it is subjected neither to tensional nor compressive strain.

The fish is centered in the region of the belly cavity at the height of the lower edge of the backbone as regards its lateral position and against turning about its longitudinal axis by the conveyor system pushing in the region of the belly cavity. The pushing elements simultaneously give the measurement for the cut of different tools, serve partly as cutting supports and also partly give the measurement for the control of the different tools. The second conveyor system acting from outside in the region extending from the end of the belly cavity to the root of the tail, in conveying the fish, stretches the tail end and therefore the entire fish because it also acts on the belly cavity portion from the outer side, centers the tail end and can also serve for feeding to other dressing devices the fish or parts thereof separated in the course of the dressing operation.

The most suitable method of carrying out the invention is to place the decapitated fish tail foremost on a saddle on which it is supported at the lower edge of the backbone, to allow it to be pushed through the machine by the saddle exerting a thrust on the rear end of the belly cavity and at the same time holding it in stretched state in the region extending from the end of the belly cavity to the root of the tail by conveyor devices engaging externally and preferably running at a higher speed than the saddle.

The apparatus for carrying out the method according to the invention can be constructed in a remarkably simple manner and operates reliably. Fundamentally only a thrust saddle movable through the machine and lateral supporting means are necessary. The thrust saddle is preferably constructed as a bevel-top saddle, which presents the advantage that the whole of the region under the bevel-top saddle is free for the unimpeded operation of the tools acting on the belly side.

As conveyor means, endless conveyor belts come primarily into consideration, but pairs of synchronized rollers may also be provided as conveyor supporting means, when, however, care must be taken that these are made as small as possible in diameter so as to obtain as far as possible a continuous conveying thrust and stretch. The efficiency of the conveyor belts can also be improved by allowing resilient pressure rollers to act on the driving end of the conveyor belts, whereby the conveyor belts adapt themselves better to the actual thickness of the fish.

An apparatus for carrying out the method according to the invention, applied to a filleting device, is illustrated by way of example in the accompanying drawing, in which:

Fig. 1 is a diagrammatic perspective view of the device, and

Fig. 2 a diagrammatic working view, assuming the simultaneous operation of all the tools.

As can be seen from Fig. 1, the two conveyor systems consist of a thrust saddle 1 movable through the machine and guided on one side and two lateral endless conveyor belts 2 and 3. The machine frame as well as the bearings and driving means of the conveyor systems and the tools hereinafter described are omitted for the sake of clarity in view of the fact that they are generally known elements having nothing to do with the invention.

The tools operating successively comprise a pair of back knives 4, a pair of belly knives 5 and a pair of flank knives 6. Two skinning conveyor belts 7 and 8 extend from the conveyor belts 2, 3 and a spreader 9 is arranged between them.

The apparatus operates in the following manner:

The decapitated fish 10, the belly cavity of which is opened up, is placed tail foremost on the bevel-top saddle 1 either by hand or mechanically. The bevel-top saddle 1 in moving through the machine, pushes the fish past the dressing tools by acting on the end of the belly cavity. The conveyor belts 2, 3, which preferably run at a higher speed than the saddle 1, firmly support the fish, particularly at the tail end, and convey it stretched from outside.

The operation of the tools is best seen from Fig. 2. The pair of back knives 4 cuts the flesh of the fish off the backbone along the entire length of the fish, whereupon the pair of belly knives 5 severs the flesh of the fish from the backbone from the end of the belly cavity to the root of the tail. The flank cut is carried out in the region of the belly cavity in known manner by the pair of flank knives 6, the bevel-top saddle 1 serving as cutting support and ensuring that the cut is carried out in a perfect manner. As the fish continues to be moved forward, the severed fillet halves are guided on to the skinning conveyor belts 7, 8 with the aid of the spreader 9 so that they are fed to the skinning device by the skinning conveyor belts resting spread out with the skin on the belts.

Fig. 2 clearly shows that the bevel-top saddle 1 guided on one side passes without hindrance over the pair of belly knives 5.

I claim:

1. A method of conveying decapitated fish bodies past the tools of a fish dressing machine, said method comprising mounting a decapitated fish body and pushing said body through the machine by forces exerted upon the mounted part thereof while simultaneously stretching said body in the region extending from the end of the belly cavity to the root of the tail thereof by forces applied to the outer surfaces of the body.

2. A method of conveying decapitated fish bodies past the tools of a fish dressing machine, said method comprising mounting a decapitated fish body and pushing said body through the machine by forces exerted upon the mounted part thereof while simultaneously stretching said body in the region extending from the end of the belly cavity to the root of the tail thereof by forces applied to the outer surfaces of the body and moving in the direction of travel of the fish body through the machine at a higher speed than that of the forces exerted upon the mounted part thereof.

References Cited in the file of this patent

UNITED STATES PATENTS

| | | |
|---|---|---|
| 2,140,575 | David et al. | Dec. 20, 1938 |
| 2,518,772 | Grausgruber | Aug. 15, 1950 |
| 2,625,708 | Oates | Jan. 20, 1953 |
| 2,637,064 | Miller | May 5, 1953 |
| 2,680,876 | Oates | June 15, 1954 |
| 2,771,633 | Bartels et al. | Nov. 27, 1956 |
| 2,803,035 | Bartels et al. | Aug. 20, 1957 |

FOREIGN PATENTS

| | | |
|---|---|---|
| 88,914 | Norway | Mar. 18, 1957 |